US006618777B1

(12) United States Patent
Greenfield

(10) Patent No.: US 6,618,777 B1
(45) Date of Patent: Sep. 9, 2003

(54) METHOD AND APPARATUS FOR COMMUNICATING BETWEEN MULTIPLE FUNCTIONAL UNITS IN A COMPUTER ENVIRONMENT

(75) Inventor: Zvi Greenfield, Ksirsava (IL)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/235,025

(22) Filed: Jan. 21, 1999

(51) Int. Cl.$^7$ ............................................... G06F 13/14
(52) U.S. Cl. ..................... 710/120; 710/309; 710/316
(58) Field of Search ............................. 710/126–128, 710/305–317, 107, 113, 119, 120

(56) References Cited

U.S. PATENT DOCUMENTS

| | | | |
|---|---|---|---|
| 4,270,167 A | | 5/1981 | Koehler et al. |
| 5,001,625 A | | 3/1991 | Thomas et al. |
| 5,301,283 A | | 4/1994 | Thacker et al. |
| 5,327,538 A | * | 7/1994 | Hamaguchi et al. |
| 5,345,566 A | * | 9/1994 | Tanji et al. |
| 5,377,189 A | * | 12/1994 | Clark |
| 5,379,394 A | | 1/1995 | Goto |
| 5,386,517 A | * | 1/1995 | Sheth et al. |
| 5,471,587 A | * | 11/1995 | Fernando |
| 5,481,679 A | * | 1/1996 | Higaki et al. ............... 710/128 |

(List continued on next page.)

FOREIGN PATENT DOCUMENTS

| | | |
|---|---|---|
| EP | 0 141 332 A2 | 5/1985 |
| WO | WO 96/37854 | 11/1996 |
| WO | WO 96/30842 | 10/1998 |

OTHER PUBLICATIONS

International Search Report from International Patent Application PCT/US00/01491, filed Jan. 20, 2000.

IBM® Technical Disclosure Bulletin, "Time–Multiplezed Bus for Interconnecting Multiple Microprocessor Cards to Each other and to a Common Set of Peripherals and Memory," vol. 27, No. 5, Oct. 1984, pp 3075–3077.

Primary Examiner—Paul R. Myers
(74) Attorney, Agent, or Firm—Wolf, Greenfield & Sacks, PC

(57) ABSTRACT

A CPU includes a number of functional units that cooperate together to execute instructions. On-chip memory is divided into several sections, each of which is connected to an associated internal bus. All of the functional units are connected to each of the internal busses so that each of the functional units can read from and write to all memory locations. To conduct a transaction with memory, a functional unit determines which memory location it requires, and then arbitrates for mastership of the bus associated with the section of memory containing that memory location. By providing two or more internal busses, two or more bus transactions can occur simultaneously. A virtual bus is provided to facilitate transactions between functional units. The virtual bus is a bus arbiter without an associated physical bus. To conduct a transaction with another functional unit, the functional unit arbitrates for mastership of the virtual bus, the virtual bus monitors the internal busses or communicates with the other bus arbiters to determine which of the internal busses is unoccupied and, upon receiving a request to access the virtual bus, assigns one of the internal busses to the requesting functional unit. Using a virtual bus is advantageous since requesting access to the virtual bus has the affect of arbitrating for each of the physical busses simultaneously. Thus, the amount of time spent arbitrating for access to the physical busses is minimized. Also, since the physical busses typically do not run at 100% capacity, allocating use of the physical busses to non-memory transactions maximizes use of the physical busses without significantly distracting from the ability of the functional units to access memory. Finally, using a virtual bus instead of an additional physical bus takes up much less space than would be required if a dedicated physical bus were provided for transactions between functional units.

16 Claims, 4 Drawing Sheets

U.S. PATENT DOCUMENTS

| | | | |
|---|---|---|---|
| 5,509,127 A | * | 4/1996 | Datwyler et al. |
| 5,551,007 A | * | 8/1996 | Miyazaki et al. |
| 5,553,249 A | * | 9/1996 | Datwyler et al. |
| 5,636,361 A | * | 6/1997 | Ingerman .................... 711/150 |
| 5,644,733 A | | 7/1997 | Kalish et al. |
| 5,708,784 A | * | 1/1998 | Yanai et al. |
| 5,734,850 A | | 3/1998 | Kenny et al. |
| 5,740,174 A | | 4/1998 | Somer |
| 5,761,448 A | | 6/1998 | Adamson et al. |
| 5,774,684 A | | 6/1998 | Haines et al. |
| 5,787,265 A | * | 7/1998 | Leshem |
| 5,796,964 A | * | 8/1998 | Bass et al. ................... 710/128 |
| 5,809,533 A | * | 9/1998 | Tran et al. ................... 711/141 |
| 5,935,232 A | * | 8/1999 | Lambrecht et al. ......... 710/128 |
| 6,052,752 A | * | 4/2000 | Kwon ........................ 710/126 |
| 6,088,753 A | * | 7/2000 | Sheafor et al. ............. 710/128 |

\* cited by examiner

METHOD AND APPARATUS FOR COMMUNICATING BETWEEN MULTIPLE FUNCTIONAL UNITS IN A COMPUTER ENVIRONMENT

BACKGROUND OF THE INVENTION

1. Field of the Invention

The present invention relates to a method and apparatus for communicating between components of a computer system and, more particularly, to a method and apparatus for communicating between multiple functional units of a central processing unit.

2. Related Art

A central processing unit or digital signal processor is the portion of a computer that receives and executes instructions. The term "CPU" as used herein will be defined to include both central processing units and digital signal processors. In modern desktop computers, the CPU is formed on a single chip of silicon and may be provided with a variety of functional units, each designed to perform a specific class of tasks, and on-chip memory. These functional units and memory communicate with each other over an internal bus. Communication over the internal bus takes place in a transaction. The internal bus of the CPU is connected via a bus interface unit (BIU) to an external bus so that other CPUs and peripheral devices, such as external memory, can issue transactions to access data or otherwise communicate with the functional units and memory within the CPU.

Since only one transaction can take place on the bus at one time, and since the internal bus is shared by many functional units, it is occasionally necessary to allow one functional unit to issue a transaction on the bus while denying another functional unit the right to issue a transaction on the bus. The process of determining which functional unit will have the right to issue a transaction on the bus is called arbitration. Numerous arbitration protocols have been developed for use in the arbitration process. The functional unit that wins the arbitration and is allowed to issue a transaction on the bus is called the bus master. A functional unit remains bus master until another functional unit successfully arbitrates mastership of the bus.

The rate at which data is transferred between functional units and memory of the CPU is often a limiting factor in the rate at which the CPU as a whole is able to execute instructions. To increase the data transfer rate, the size or speed of the bus may be increased, or the number of busses interconnecting the functional units and memory may be increased. If the number of busses is increased, the data transfer rate is increased by providing an increased number of paths over which data can be transferred as well as reducing the number of unsuccessful arbitrations.

Increasing the number or size of the internal busses, however increases the amount of space on the CPU's chip that must be dedicated to implementation of the internal bus. Since space on the CPU chip is limited, minimizing the amount of space allocated to implementation of the internal bus is quite important. Accordingly, what is needed is a method and apparatus for increasing the data transfer rate between functional units and memory of a CPU that also minimizes the amount of space needed to implement the bus.

SUMMARY OF THE INVENTION

The present invention relates to a CPU having a number of functional units that cooperate together to execute instructions. On-chip memory is divided into several sections, each section of which is connected to one of a plurality of internal busses. All of the other functional units are connected to each of the internal busses so that each of the functional units can read from and write to all memory locations. When one of the functional units would like to access memory, it determines which memory location it requires, and then arbitrates for mastership of the bus associated with that section of on-chip memory. By providing two or more internal busses, two or more bus transactions can occur simultaneously.

Occasionally, the functional units will need to access another functional unit or a functional unit outside of the CPU. To minimize conflicts with internal memory transactions in this situation, the functional unit arbitrates for access of a virtual bus. The virtual bus includes a bus arbiter, but does not include a physical bus. Instead, the virtual bus arbiter monitors the internal busses or communicates with the other bus arbiters to determine which of the internal busses is unoccupied and, upon receiving a request to access the virtual bus, assigns one of the internal busses to the requesting functional unit. As used herein, the term "virtual bus" will be used to designate a bus arbiter without an associated physical bus. The specific protocol used by the virtual bus to allocate mastership of the physical busses will be discussed in greater detail below.

Using a virtual bus is advantageous for several reasons. First, since the virtual bus has information relating to use of the physical busses by other functional units, requesting access to the virtual bus has the affect of arbitrating for each of the physical busses simultaneously. Thus, the amount of time spent arbitrating for access to the physical busses is minimized. Second, since the physical busses typically do not run at 100% capacity, allocating use of the physical busses to non-memory transactions maximizes use of the physical busses without significantly distracting from the ability of the functional units to access memory. Finally, using a virtual bus instead of an additional physical bus takes up much less space on the chip. Accordingly, transactions between two or more functional units and between a functional unit and an outside resource can be accommodated without increasing the amount of space required for implementation of the internal bus while minimizing the amount of time wasted in arbitration.

In one embodiment, this invention is a processor including three physical busses, each associated with a bank of memory, and a virtual bus. A plurality of functional units are connected to each of the physical busses. Those functional units that are capable of initiating transactions on one of the physical busses are also connected to the virtual bus. In operation, when a functional unit would like to initiate a transaction with memory, the functional unit arbitrates for mastership of the bus associated with the bank of memory and, upon becoming bus master, completes its transaction. When a functional unit would like to initiate a transaction not involving memory, the functional unit arbitrates for mastership of the virtual bus and, upon becoming master of the virtual bus, completes its transaction.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

DETAILED DESCRIPTION

The present invention relates to the structure of the internal bus 16 in a CPU 10, and the manner in which transactions take place on the internal bus 16. In this invention, the internal bus 16 is formed from two or more physical busses. These physical busses can be formed as two or more separate busses or can be formed as one large bus that is logically divided into two or more individually addressable busses. As used herein, the term "physical bus" will refer to either a separately formed bus or a logically formed bus. By providing two or more physical busses, two or more transactions can take place simultaneously.

The CPU memory is divided into two or more memory banks or areas, each of which is connected via an associated physical bus to each of the functional units. The memory banks may be separately formed or may be logically split into multiple banks according to memory address from one larger memory. Simultaneously reading data from separately formed memory banks is not problematic, thus any type of dynamic random access memory (DRAM) may be used to form separate memory banks. If it is desired to logically segregate memory banks from a larger memory, synchronous DRAM (SDRAM) or any other type of memory that will allow data to be read simultaneously from more than one location should be used.

Figure 1:
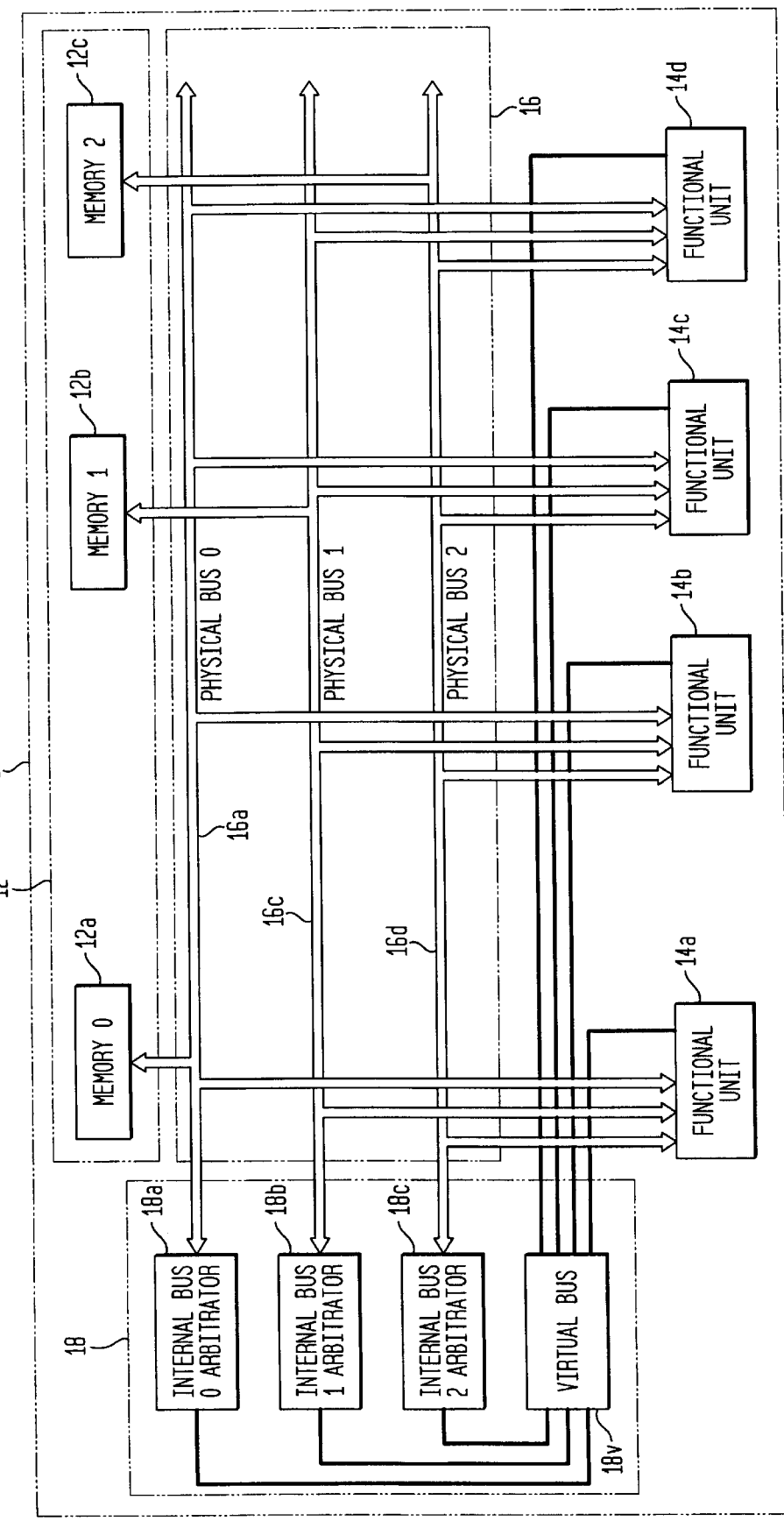
FIG. 1 is a functional block diagram of a CPU illustrating the interconnection between functional units of the CPU and three internal busses.

In one embodiment, such as the embodiment illustrated in FIG. 1, the number of memory banks is the same as the number of physical busses, and each physical bus is uniquely associated with only one of the memory banks of the memory 12. Although in this embodiment there is a one-to-one association between the memory banks and physical busses, other associations could be used, such as a two-to-one or three-to-one association. Likewise, although the concepts associated with this invention will be described with respect to three internal busses, any number of internal busses greater than or equal to two may be used.

In the illustrated embodiment, transactions involving a transfer of data between a functional unit and a particular location in memory can only take place over the particular physical bus 16a–c that is associated with the memory bank 12a–c containing the particular memory location. Since all functional units 14a–d typically need to have access to all memory locations, each functional unit 14a–d is connected to each physical bus 16a–c. Transactions between memory 12 and functional units 14a–d occur according to any known protocol. Arbitration between contending functional units 14a–d for simultaneous access to the physical busses 16a–c takes place in arbitration unit 18. Any conventional protocol may be used to arbitrate mastership of the physical busses by the arbitration unit 18.

Transactions between functional units 14a–d not involving memory banks 12a–c take place over a virtual bus 18v. The virtual bus includes a bus arbiter with no associated physical bus. The virtual bus 18v receives requests for mastership of the virtual bus 18v, arbitrates conflicts, and assigns one of the three physical busses 16a–c to the requesting functional unit.

In the embodiment illustrated in FIG. 1, three physical busses 16a–c are provided that together form the internal bus 16. Each of the three physical busses 16a–c is connected to and associated with one memory bank 12a–c that together form the memory 12. Specifically, physical bus 16a is connected to memory bank 12a and not to memory bank 12b or memory bank 12c; physical bus 16b is connected to memory bank 12b and not to memory bank 12a or memory bank 12c; and physical bus 16c is connected to memory bank 12c and not to memory bank 12a or memory bank 12b. In this way, each memory bank 12a–c is uniquely associated with one of the three physical busses 16a–c. Although three physical busses and three memory banks are illustrated, the invention is not limited in this respect; two, three, four or more memory banks and physical busses may be used.

An arbitration unit 18 arbitrates mastership over the physical busses 16a–c. The arbitration unit 18 may be a single arbitration unit adapted to arbitrate mastership over each of the three physical busses 16a–c or may be three individual arbitration units 18a–c, each of which is associated with one of the physical busses 16a–c and adapted to arbitrate mastership of the associated physical bus 16a–c. In the embodiment illustrated in FIG. 1, three individual arbitration units 18a–c are provided, each of which is associated with one of physical busses 16a–c. These arbitration units 18a–c may be formed to arbitrate mastership of their associated physical bus using the same protocol or different protocols. Any known protocol may be used by any arbitration unit 18a–c to arbitrate mastership of the associated physical bus 16a–c.

Each functional unit 14a–d is connected to each of the three physical busses 16a–c. Accordingly, each functional unit 14a–d can conduct transactions with any memory bank 16a–c simply by arbitrating for mastership of the appropriate physical bus 16a, 16b or 16c. Likewise, data can be written to registers of any of the functional units 14a–d during a transaction from any memory bank 12a–c over the associated physical bus 16a–c, even when the functional unit 14a–d is not the bus master or is not capable of becoming the bus master.

To conduct a transaction with one of the memories 12a–c, the functional unit 14a–d determines which memory 12a–c must be accessed according to memory location or any other method, and communicates with the arbiter 18a–c associated with the correct bus 16a–c. The arbiter 18a–c determines if more than one functional unit 14a–d is requesting access to the bus 16a–c. If so, the arbiter 18a–c selects one of the requesting functional units 14a–d as the next bus master using the arbitration protocol. Once the functional unit 14a–d has become bus master of the physical bus 12a–c, the functional unit 14a–d issues its transaction.

As discussed below, using a virtual bus to facilitate transactions between functional units minimizes the amount of space required for implementation of the internal bus 12. If a functional unit 14a–d, for example functional unit 14a, would like to issue a transaction to communicate with another functional unit, such as functional unit 14c, the functional unit 14a could communicate with one of the arbiters 18a–c, for example 18b, and, upon obtaining mastership of the respective bus 16b, conduct its transaction on bus 16b. This approach would be inefficient, however, because the requesting functional unit 14a has no way of knowing if bus 16b is mastered by another functional unit. It may be that bus 16b is currently mastered by another functional unit whereas the other busses, 16a, 16c, are not currently mastered by other functional units. Accordingly, requiring the requesting functional unit to arbitrarily request mastership of any one of the physical busses 16a–c for a transaction that can occur on any one of the physical busses 16a–c is inefficient.

To eliminate this source of inefficiency, a virtual bus 18v is provided to handle transactions that can occur on any of the internal busses 16a–c, such as transactions between functional units 14a–d. The virtual bus 18v includes a virtual bus arbiter with no associated physical bus. When a functional unit 14a–d needs to conduct a transaction with another functional unit 14a–d, it arbitrates for mastership of the virtual bus 18v. The virtual bus 18v receives the request, arbitrates between competing requests and assigns one of the physical busses 16a–c to the requesting functional unit 14a–d.

If more than one functional unit 14a–d requests access to the virtual bus simultaneously, the virtual bus arbiter may select one functional unit 14a–d to become the next bus master of the virtual bus 18v according to any know protocol. One or more functional units 14a–d may be given a priority status vis-a-vis different functional units 14a–d, and may be provided with a rotating or stationary priority vis-a-vis similar functional units. In many arbitration protocols, the priority status of a functional unit 14a–d will determine which functional unit 14a–d wins the arbitration for mastership of the virtual bus 18v.

The virtual bus 18v communicates with the other arbiters 18a–c to ascertain mastership of the associated physical busses 16a–c and to grant mastership to a requesting functional unit 14a–d. In connection with granting mastership of the physical busses 16a–c, the virtual bus 18v may monitor the arbitration processes taking place in the arbitration units 18a–c, may be provided with signals indicative of mastership of the physical busses 16a–c by the arbiters 18a–c or may be provided with any other input sufficient to enable the virtual bus 18v to ascertain the current mastership status of the internal busses 16a–c, such as by monitoring arbitration signals from all the functional units and performing logical operations to determine bus mastership concurrent with the arbiters 18a–c. Once one of the physical busses 16a–c has been assigned by the virtual bus 18v, the assignment is communicated to the relevant arbiter 18a–c and the requesting functional unit. The functional unit 14a–d that obtains mastership of the virtual bus, and hence of to the selected physical bus, then issues its transaction over the assigned physical bus.

In the current embodiment, the virtual bus 18v may allocate mastership of any of the three physical busses 16a–c to a requesting functional unit 14a–d. The invention is not limited in this regard, rather in alternative embodiments the virtual bus 18v may be configured to only allocate mastership of a subset of the physical busses, such as physical busses 16a–b, to requesting functional units 14a–d.

Many known functional units 14 may communicate with one another over the virtual bus 18v. Exemplary functional units include: one or more compute blocks to execute instructions; one or more instruction sequencers to prefetch instructions from memory, pass the instructions to the compute blocks, and to control the flow of the program being executed by the CPU; one or more arithmetic logic units to perform arithmetic calculations; one or more external bus interface units to provide an interface between the internal bus 12 and an external bus; one or direct memory access (DMA) or link controllers to facilitate the rapid transfer of data between memory 12 and functional units 14, etc.

Figure 2:
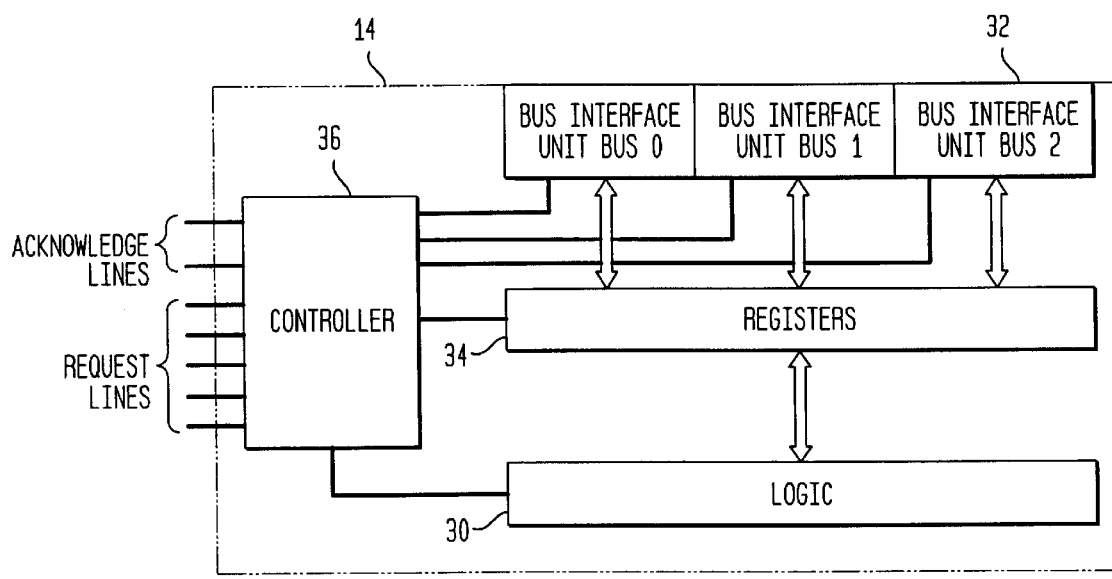
FIG. 2 is a functional block diagram of a functional unit for use in the CPU of FIG. 1.

FIG. 2 illustrates in greater detail an exemplary functional unit 14 that is capable of becoming bus master. Note that not all functional units necessarily must be able to become bus master. The logic 30 may be configured in any known manner to enable the functional unit 14 to function as one of the above described functional units or any other functional unit 14.

Figure 4:
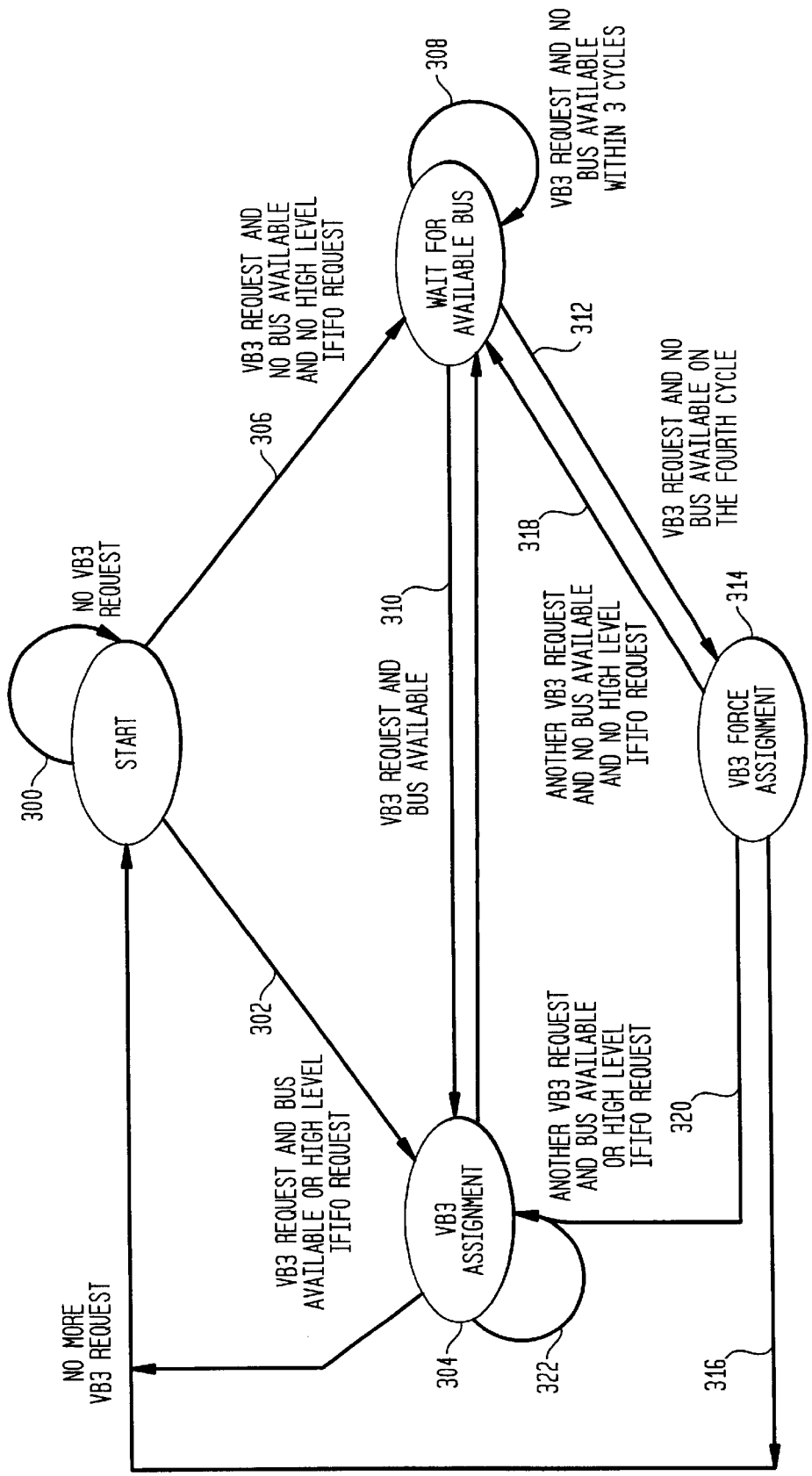
FIG. 4 is a state diagram of the arbitration protocol employed by the virtual bus for assigning physical busses when requests are made for mastership of the virtual bus.

The functional unit 14 illustrated in FIG. 4 includes a set of three bus interface units 32a–c for interfacing with the three internal busses 16a–c. Registers 34 are interposed between the bus interface units 32a–c and the logic 30 to receive data from the busses 16a–c. The registers 34 may include a single register bank or may be subdivided logically or physically into multiple register banks. The registers optionally may also be configured to hold data for transmission over the internal busses 16a–c.

A controller 36 is provided to control arbitration for access to one of the three physical busses 16a–c or the virtual bus 18v. Four or more request lines are provided over which signals can be transmitted to communicate requests for mastership of the physical and virtual busses to the arbiters 18a–c and virtual bus 18v. Depending on the arbitration protocol, one or more acknowledge lines may be provided over which signals can be transmitted to communicate the result of the arbitration to the controller 36. The controller 36 is connected to the bus interface units 32, registers 34 and logic 30 to communicate the result of a successful arbitration and to coordinate participation in a transaction over the appropriate physical bus 16a–c or virtual bus 18v.

In functional units 14a–d not capable of becoming bus master, the controller 36 is not provided with request lines and other associated circuitry required to arbitrate for mastership of the physical or virtual busses 16a–c, 18v. These slave functional units 14a–d will, however, have the ability to communicate with other functional units 14a–d to enable read and write operations to take place to and from their registers in any known manner.

Figure 3:
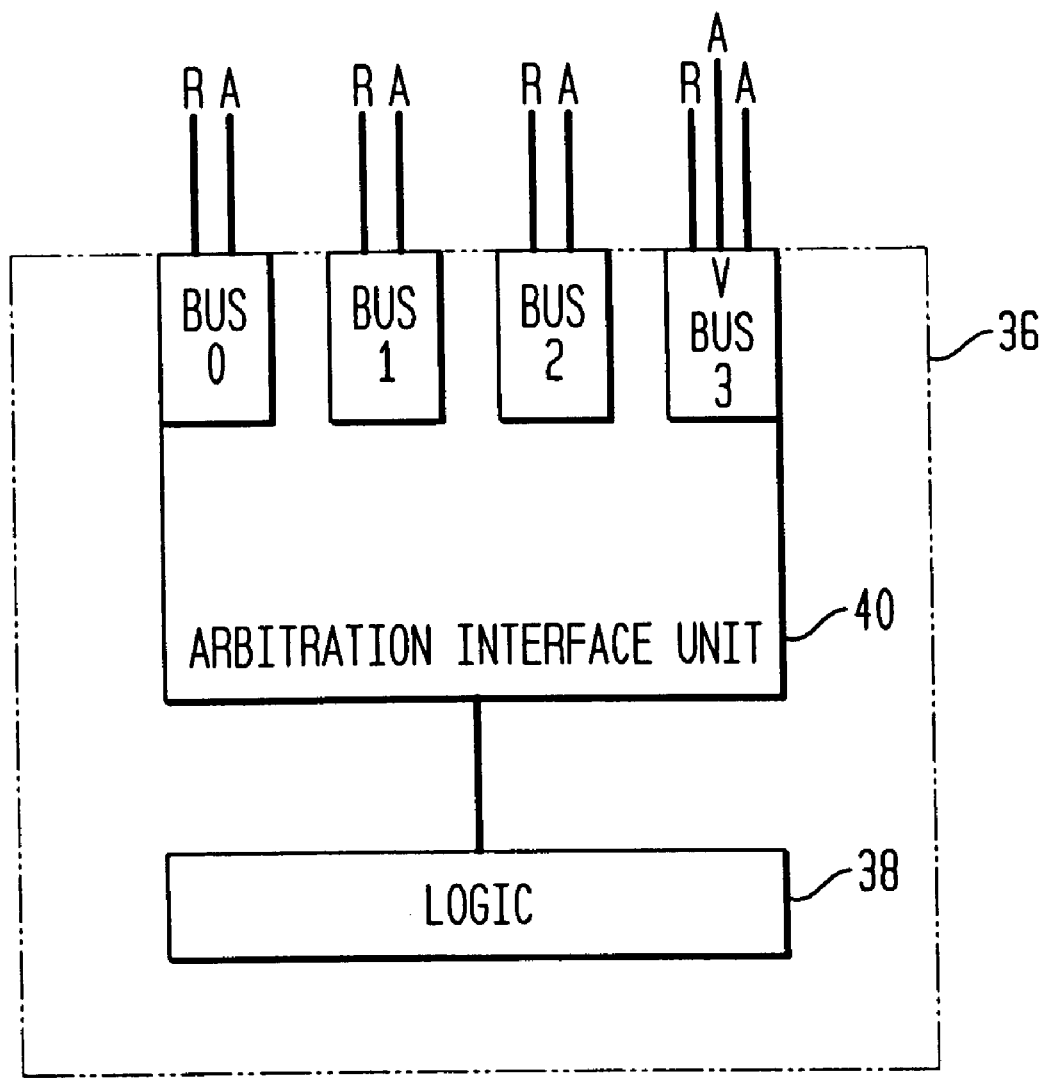
FIG. 3 is a functional block diagram of a controller of FIG. 2.

One embodiment of an exemplary controller 36 is illustrated in more detail in FIG. 3. As shown in FIG. 3, the controller 36 has logic circuitry 38 configured to receive instructions from the functional unit logic 30 indicative of the need to perform a transaction over one of the internal busses 16a–c, 18v and the nature of the proposed transaction. The controller logic 38 deciphers the instruction from the functional unit logic 30 and determines which bus 16a–c or 18v is to be accessed. The controller logic 38 then communicates to the arbitration interface unit 40 that one or more of the busses 16a–c or 18v must be accessed.

The arbitration interface unit 40 is connected to a bus request line (R) and acknowledge line (A) for each of the physical busses 16a–c. The bus request and acknowledge lines are connected to the respective arbiter 18a–c; signals on these lines enable the functional unit to take place in arbitration for mastership of the physical busses 16a–c The arbitration interface unit 40 is also connected to a virtual bus request line (R) and two virtual bus acknowledge lines (A). Signals on the virtual bus request line enable the arbitration interface unit 40 to arbitrate for mastership of the virtual bus 18v. However, since the virtual bus 18v must not only communicate the result of the arbitration, but also the number of the physical bus 16a–c over which mastership has been granted, more than one acknowledge line must be used to transmit signals acknowledging the result of the arbitration. Specifically, if two virtual bus acknowledge lines are used, the virtual bus arbiter will be able to send signals to the requesting functional unit 14 that (a) the request was denied, or (b) the specific number of the physical bus over which mastership has been granted. One way to do this is set forth in the following table:

| Combination of Signals on Acknowledge Lines | Result |
| --- | --- |
| Low, Low | Use Physical Bus 0 |
| Low, High | Use Physical Bus 1 |
| High, Low | Use Physical Bus 2 |
| High, High | Request Denied |

Other combinations are equally plausible. Two lines allow for up to four possible combinations of states, thus enabling the virtual bus 18v to communicate four results to the arbitration unit interface unit 40. If there are additional internal busses, for example 6 internal busses, it may become necessary to include an additional virtual bus acknowledge line to carry signals indicative of the result of the arbitration to the arbitration unit interface unit 40 or to alter the method in which acknowledgment is provided.

FIG. 4 is a state diagram illustrating an exemplary protocol for use by the virtual 18v bus when assigning busses to requesting functional units 14a–d. As shown in FIG. 4, at the start (when no request is pending), the virtual bus 18v waits for a functional unit 14a–d to request mastership of the virtual bus 18v (300). If the virtual bus 18v is requested and one or more of the physical busses 16a–c is available or the request is a request of higher priority "a priority request" (302) the available bus or one of the physical busses 16a–c is immediately assigned (304). If the virtual bus 18v is requested and no physical bus 16a–c is available and the request is not a priority request (306), the virtual bus 18v will wait for up to three cycles to see if a physical bus 16a–c becomes available (308). If during this waiting period, a physical bus 16a–c becomes available (310), the available physical bus 16a–c will be assigned (304).

If the virtual bus 18v is still requested and no physical bus 16a–c is available at the fourth cycle after the virtual bus has been requested (312), the virtual bus 18v will force an assignment (314), which involves wresting control over one of the physical buses 16a–c and passing mastership to the requesting functional unit 14a–d. Selection of the physical bus to be assigned and the process of wresting control of the bus and reassigning it to the requesting functional unit 14a–d may be performed in any known manner. In one embodiment, the virtual bus 18v wrests control over a different physical bus 16a–c each time it is necessary to do so to avoid monopolization of any one physical bus and thus assure equal access to all memory locations by the functional units 14a–d.

After forcing assignment of the physical bus 16a–c (314), the virtual bus 18v will either return to start (316) if there is no pending request for mastership of the virtual bus 18v, wait for the next available physical bus 16a–c if there is no physical bus 16a–c available and the pending virtual bus request is not high priority (318), or assign a physical bus 16a–c if there is an available physical bus 16a–c or the virtual bus request is high priority (320). The virtual bus 18v will continue to assign physical busses 16a–c as long as at least one of the physical busses 16a–c is available, or the virtual bus requests are high priority (322).

In one embodiment, if more than one functional unit 14a–d has requested mastership of the virtual bus 18v, and more than one physical bus 16a–c is idle, the virtual bus 18v may be configured to assign more than one physical bus 16a–c at the same time. In this situation, the virtual bus 18v can itself act as multiple busses and, in effect, be mastered by more than one functional unit 14a–d at the same time. Alternatively, the virtual bus 18v may be configured to only assign one physical bus 16a–c at one time, regardless of the availability of the physical busses 16a–c.

It should be understood that various changes and modifications of the embodiments shown in the drawings and described in the specification may be made within the spirit and scope of the present invention. For example, although this invention has been described in connection with the internal bus of a processing unit, the concepts apply equally to an external bus interconnecting multiple CPUs. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A processor, comprising:

a memory;

a plurality of functional units;

a plurality of physical busses interconnecting the memory and functional units;

at least one physical bus arbiter for each of said physical busses for allocating mastership of the bus to the functional units; and a virtual bus, connected to at least two of said functional units, and not associated with any of the physical busses, the virtual bus receiving a request for a physical bus from one of the plurality of functional units and assigning an available one of the plurality of physical busses to said functional unit.

2. The processor of claim 1, further comprising at least one physical bus arbiter for each of said physical busses for allocating mastership of the bus to the functional units.

3. The processor of claim 2, wherein the virtual bus comprises a virtual bus arbiter connected to at least a plurality of said functional units and not associated with any of said physical busses for allocating mastership of said physical busses to requesting functional units.

4. The processor of claim 1, wherein each of said physical busses is associated with a particular portion of said memory.

5. A processor, comprising:

a first section of memory;

a first physical bus associated with said first section of memory;

a first bus arbitration unit associated with said first physical bus;

a second section of memory;

a second physical bus associated with said second section of memory;

a second bus arbitration unit associated with said second physical bus;

a virtual bus comprising a third bus arbitration unit and no associated physical bus;

a plurality of functional units, connected to the first physical bus for conducting transactions with the first section of memory, connected to the second physical bus for conducting transactions with the second section of memory, and connected to the virtual bus for conducting transactions with each other; and wherein conducting transactions between a first functional unit and the first section of memory further comprises arbitrating for mastership of the first physical bus, conducting transactions between the first functional unit and the second section of memory further comprises arbitrating for mastership of said second physical bus, and conducting transactions between the first functional unit and any other of the plurality of functional units further comprises arbitrating for mastership of the virtual bus, which determines an available physical bus, and the virtual bus assigns said available physical bus to the first functional unit.

6. The processor of claim 5, wherein the first physical bus and the second physical bus are formed separately.

7. The processor of claim 5, wherein the first physical bus and the second physical bus are formed together and logically divided into individually addressable busses.

8. The processor of claim 5, wherein the first section of memory and the second section of memory are formed from a single dynamic random access memory logically separated by memory address.

9. The processor of claim 5, wherein the first section of memory and the second section of memory are formed from two individual memories.

10. The processor of claim 5, wherein the first bus arbitration unit and the second bus arbitration unit are formed from a single bus arbitration unit, and wherein the virtual bus is formed as part of the single bus arbitration unit.

11. The processor of claim 5, wherein the first bus arbitration unit and the second bus arbitration unit are formed as independent units.

12. The processor of claim 5, further comprising lines interconnecting the first bus arbitration unit and the second bus arbitration unit with the virtual bus.

13. The processor of claim 12, wherein the signals interconnecting the first bus arbitration unit and the second bus arbitration unit are adapted to carry signals indicative of requests by the virtual bus of mastership over the first and second physical busses.

14. The processor of claim 12, wherein the signals interconnecting the first bus arbitration unit and the second bus arbitration unit are adapted to carry signals indicative of usage of the first physical bus and the second physical bus.

15. A method of satisfying requests in a system comprising a plurality of sections of memory, a physical bus associated with each of the plurality of sections of memory, a plurality of functional units, wherein each functional unit is connected to each physical bus, and a virtual bus, comprising:

satisfying a first request between a first section of memory and a first functional unit by arbitrating for the physical bus associated with a first section of memory; and satisfying a second request between the first functional unit and a second functional unit by arbitrating for mastership of the virtual bus, and upon obtaining mastership of the virtual bus, the virtual bus assigning an available physical bus to satisfy the second request.

16. The method of claim 15, wherein arbitrating for mastership of the virtual bus further comprises one of the following:

determining that there is an available physical bus, and assigning said available physical bus to the second request;

determining that there are no available physical busses, determining that the second request is of higher priority than a currently executing request, and assigning the second request to a physical bus in place of said currently executing request; and determining that there are no available physical busses, determining that the second request is not of higher priority than any currently executing requests, and waiting for up to a predetermined number of cycles for an available physical busses.

* * * * *